United States Patent
Rakshit (10) Patent No.: US 11,961,419 B2
(45) Date of Patent: Apr. 16, 2024

(54) EVENT DETECTION AND PREDICTION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/336,465

(22) Filed: Jun. 2, 2021

(65) Prior Publication Data

US 2022/0392369 A1    Dec. 8, 2022

(51) Int. Cl.
| | |
|---|---|
| *G06T 11/60* | (2006.01) |
| *G06F 21/62* | (2013.01) |
| *G06F 40/169* | (2020.01) |
| *G06Q 50/26* | (2012.01) |
| *G09B 9/00* | (2006.01) |

(52) U.S. Cl.
CPC ........... *G09B 9/00* (2013.01); *G06F 21/6218* (2013.01); *G06F 40/169* (2020.01); *G06Q 50/265* (2013.01); *G06T 11/60* (2013.01)

(58) Field of Classification Search
CPC .......... G09B 9/00; G06T 11/60; G06F 40/169
USPC ....................................................... 345/634
See application file for complete search history.

(56) References Cited

U.S. PATENT DOCUMENTS

| | | | |
|---|---|---|---|
| 9,390,501 B2 * | 7/2016 | Marty | A63B 24/0003 |
| 9,704,369 B2 | 7/2017 | Richardson | |
| 10,130,311 B1 * | 11/2018 | De Sapio | A61B 5/7455 |
| 10,945,641 B2 | 3/2021 | Mirelman | |
| 11,043,095 B1 * | 6/2021 | Derickson | G06Q 50/265 |
| 2016/0063387 A1 * | 3/2016 | Srivastava | G06N 5/048 |
| | | | 709/204 |
| 2017/0243346 A1 * | 8/2017 | Hall | A61B 5/458 |
| 2019/0000325 A1 * | 1/2019 | Dedroog | A61B 5/02042 |
| 2020/0250954 A1 | 8/2020 | Tan | |
| 2021/0279382 A1 * | 9/2021 | Le Chevalier | A63B 5/20 |

OTHER PUBLICATIONS

"Apple Watch saves life of a US-based man with its Fall Detection feature", Published on: Jun. 9, 2020, 6 pages, https://www.indiatvnews.com/technology/news-apple-watch-saves-life-fall-detection-feature-see-how-624750>.
"IBM Maximo Application Suite: Mobile EAM", Downloaded Mar. 30, 21, 11 pages, <https://www.ibm.com/products/maximo/mobile-eam#section-heading-3>.
Boyle et al., "Simulated Fall Detection via Accelerometers", 30th Annual International IEEE EMBS Conference Vancouver, British Columbia, Canada, Aug. 20-24, 2008, 5 pages, <https://www.researchgate.net/profile/Mohan_Karunanithi/publication/23932067_Simulated_Fall_Detection_via_Accelerometers/links/0912f505d2f57e7fbb000000.pdf>.
Brownlee, Jason, "A Gentle Introduction to Generative Adversarial Networks (GANs)", Last Updated on Jul. 19, 2019, 28 pages, <https://machinelearningmastery.com/what-are-generative-adversarial-networks-gans/>.
La Blunda et al., "A Wearable Fall Detection System Based on Body Area Networks", IEEE Access, Date of current version Nov. 3, 2020, 15 pages, <https://ieeexplore.ieee.org/stamp/stamp.jsp?arnumber=9233318>.

* cited by examiner

*Primary Examiner* — Thomas J Lett
(74) *Attorney, Agent, or Firm* — Brian M. Restauro (57) ABSTRACT

Embodiments of the present invention can be used to in response to receiving information, dynamically detecting an event associated with a user. Embodiments of the present invention can then, in response to dynamically detecting an event associated with the user, creating a visual simulation of the detected event.

17 Claims, 4 Drawing Sheets

EVENT DETECTION AND PREDICTION

BACKGROUND

The present invention relates in general to wearable devices and in particular to prediction and recreation of an event using wearable devices.

Wearable technology are smart electronic devices (e.g., electronic device with micro-controllers) that are worn close to or on the surface of a user's skin. Wearable devices can detect, analyze, and transmit information concerning (e.g., body signals such as vital signs, and ambient data) which allow in some cases immediate biofeedback to the wearer. Wearable devices such as activity trackers are an example of the Internet of Things (IoT) such as electronics, software, sensors, and connectivity are effectors that enable objects to exchange data (including data quality) through the internet with a manufacturer, operator, and other connected devices, without requiring human intervention.

Occupational safety and health typically refers to a multidisciplinary field concerned with the safety, health, and welfare of people at occupation. In general, the goal of an occupational safety and health program is to foster a safe and healthy occupational environment. Hazards can typically be classified as either a physical hazard or a biological hazard. Personal protective equipment can help protect against these hazards.

Predictive analytics generally encompass a variety of statistical techniques from data mining, predictive modelling, and machine learning that analyze current and historical facts to make predictions about future or otherwise unknown events. Predictive models can identify or otherwise exploit patterns found in historical and transactional data to identify risks and opportunities. Models capture relationships among many factors to allow assessment of risk or potential associated with a particular set of conditions, guiding decision-making for an action.

SUMMARY

According to an aspect of the present invention, there is provided a computer-implemented method. The computer implemented method comprises in response to receiving information, dynamically detecting an event associated with a user; and in response to dynamically detecting an event associated with the user, creating a visual simulation of the detected event.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize limitations with respect accident prediction and prevention. For example, embodiments of the present invention recognize that current systems (e.g., wearable devices) are typically focused on mitigation solutions after an accident has occurred. For example, current systems can enable an Internet of Things (IoT) wearable device to take action (e.g., make a phone call) after the wearable device detects an accident (e.g., after the wearable device detects the associated user has fallen). In other examples, current systems can be preconfigured to execute a workflow (e.g., a series of actions) once an event (e.g., accident) is detected or is otherwise triggered.

Embodiments of the present invention solve this problem by providing a proactive solution that can be implemented before an event occurs. Embodiments of the present invention further augments existing systems by creating (or otherwise recreating) an event (e.g., an accident) such as a fall. In this manner, embodiments of the present invention can create a visual simulation of the detected event and show events leading up to and causing the fall while analyzing the potential injuries of the user (e.g., determining the severity of an injury). Embodiments of the present invention can then transmit the created visual simulation to other authorized users (e.g., medical personnel) with the user's informed consent.

Figure 1:
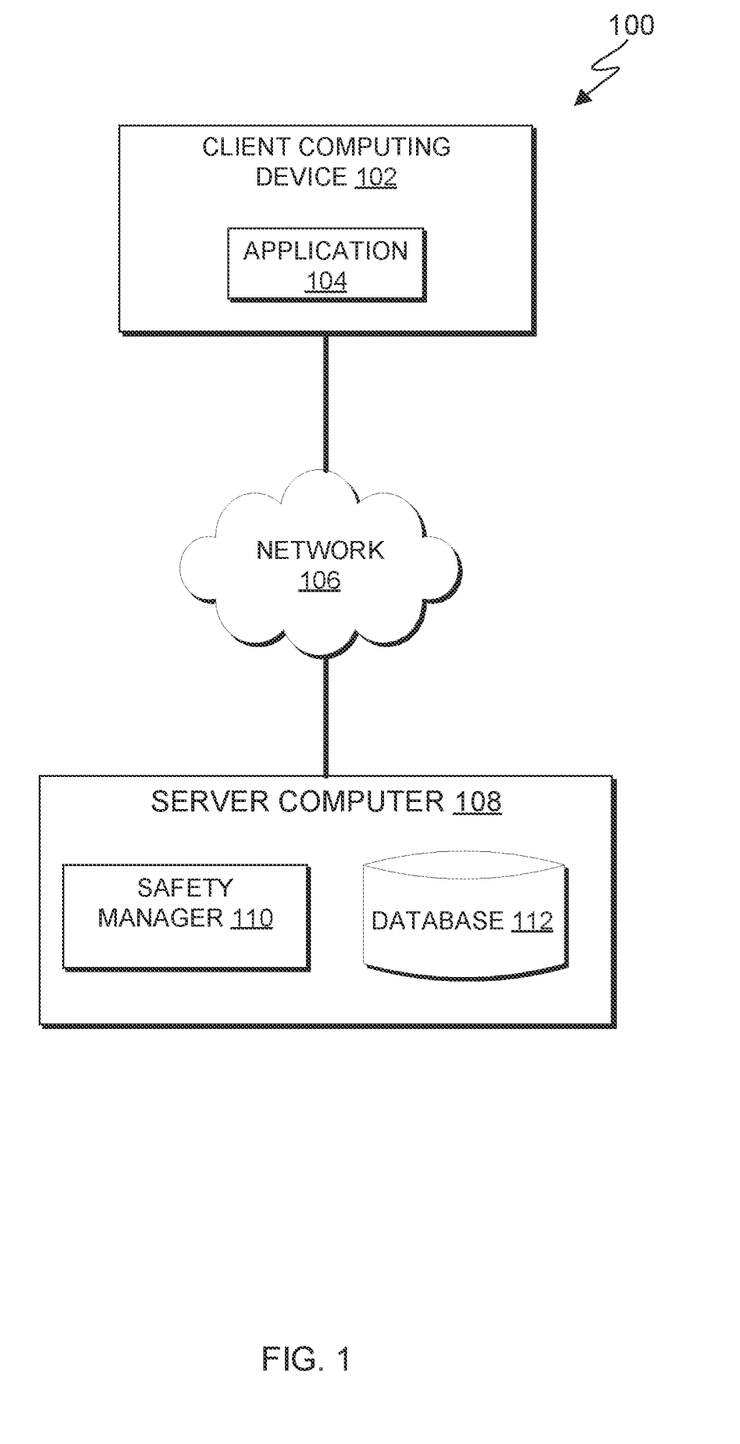
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access safety manager 110 (e.g., using TCP/IP) to access content, user information, and database information. Application 104 can further communicate with safety manager 110 to transmit instructions to detect events, identify potential causes for the detected events, and create visual simulations of the detected events comprising one or more graphic icon overlays indicating potential causes and potential portions of the user that may be injured. Specifically, embodiments of the present invention increase security by utilizing the immutable nature of blockchain at several levels as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts safety manager 110 and database 112. In this embodiment, safety manager 110 resides on server computer 108. In other embodiments, safety manager 110 can have an instance of the program (not shown) stored locally on client computer device 102. In other embodiments, safety manager 110 can be a standalone program or system that detects and creates visualizations of the detected event. In yet other embodiments, safety manager 110 can be stored on any number or computing devices.

Safety manager 110 detects events and creates visualization of the detected event. An event, as used herein, refers to one or more actions or series of movements that can result in injury to a user. In this embodiment, an event can be a detected fall of a user. An event can also include interactions with potential physical (e.g., moving parts, sharp edges, hot surfaces, hazards with potential to crush, burn cut, shear, wound, etc.) or biological hazards (chemical exposure, allergens, exposure to microorganisms such as viruses, bacteria, toxins, etc.).

In this embodiment, safety manager 110 can detect events using one or more sensors that can measure sudden changes (e.g., statistically significant deviations) to a user's baseline biometric measurements (e.g., normal, active, and resting heart rates, oxygen levels, etc.). For example, safety manager 110 can collect and subsequently store a user's baseline biometric measurements (with the user's informed consent) utilizing one or more sensors from any number of wearable devices. Safety manager 110 can then leverage information collected from those same one or more sensors to detect an event by identifying sudden changes to the user's baseline biometric measurements.

Safety manager 110 can further collect and store information from those one or more sensors to identify body positioning of a user before, after, and during the event. For example, in response to detecting fall, safety manager 110 can gather or otherwise access sensor information associated with registered wearable devices of the user (e.g., before, after, and during the event). In some embodiments, the sensor information collection can be done at specified, pre-configured time interviews. For example, safety manager 110 can collect or otherwise access sensor information from 2 minutes before the fall prediction and fall detection time, and post fall detection duration (e.g., 2 minutes after the fall). In this way, safety manager 110 can have recent sensor information to create a visual simulation (e.g., an animated video) of the user to show how the user was moving before fall, during fall and after the fall. Using this information, safety manager 110 can then create a visual simulation (e.g., animated video) of the event using Generative Adversarial Networks (GAN).

In some embodiments, safety manager 110 can also include biometric parameters and information associated with the user (e.g., like headache, low pressure etc.) in the created visual simulation. For example, safety manager 110 can create one or more tables or graphic icons that can be overlaid on top of the created visual simulation. In other embodiments, safety manager 110 can create a textual format of the biometric parameters and information and can accordingly transmit at least one of the created visual simulation, the created visual simulation with the graphic overlays, and textual format of the biometric parameters and information to one or more authorized users (e.g., medical personnel, other registered users, etc.)

In some embodiments, safety manager 110 can derive additional insights regarding the event utilizing one or more machine learning algorithms and artificial intelligence algorithms. For example, in some embodiments safety manager 110 can predict a cause of the event (e.g., a series of movements that led to a fall) and can understand contextual situation that led to the event through historical learning. Specifically, safety manager 110 can further overlay graphics display on top of or superimposed on the created visual simulation that highlight predicted points on the user's body where the user might be injured as a result of the event. For example, safety manager 110 can overlay one or more graphics (e.g., a red circle) over a user's body part (e.g., knee, portion on the back) that moves with the user to show potential impact points.

In certain embodiments, safety manager 110 can generate a text report to accompany the visual simulation that notes any predicted change with respect to the cause of the event, an appropriate notification of the detected event, and suggestions to prevent the detected event in the future. For example, safety manager 110 can recommend additional actions a user can take to increase safety (e.g., personal protective equipment, protocols, etc.). In certain other embodiments, safety manager 110 can, with user permission, monitor safety protocols and transmit reminders and notifications to users to follow safety protocols.

In response to detecting an event, safety manager 110 can take one or more actions to assist a user. In this embodiment, an action can include performed tasks taken on behalf of the user. For example, safety manager 110 can call one or more other users (e.g., an SOS call) to emergency services and subsequently transmit the created visual simulation. In some embodiments, these actions can be preconfigured, or otherwise automated workflows performed in response to an event.

Database 112 stores received information and can be representative of one or more databases that give permissioned access to safety manager 110 or publicly available databases. For example, database 112 can store received user biometrics and created visual simulations. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
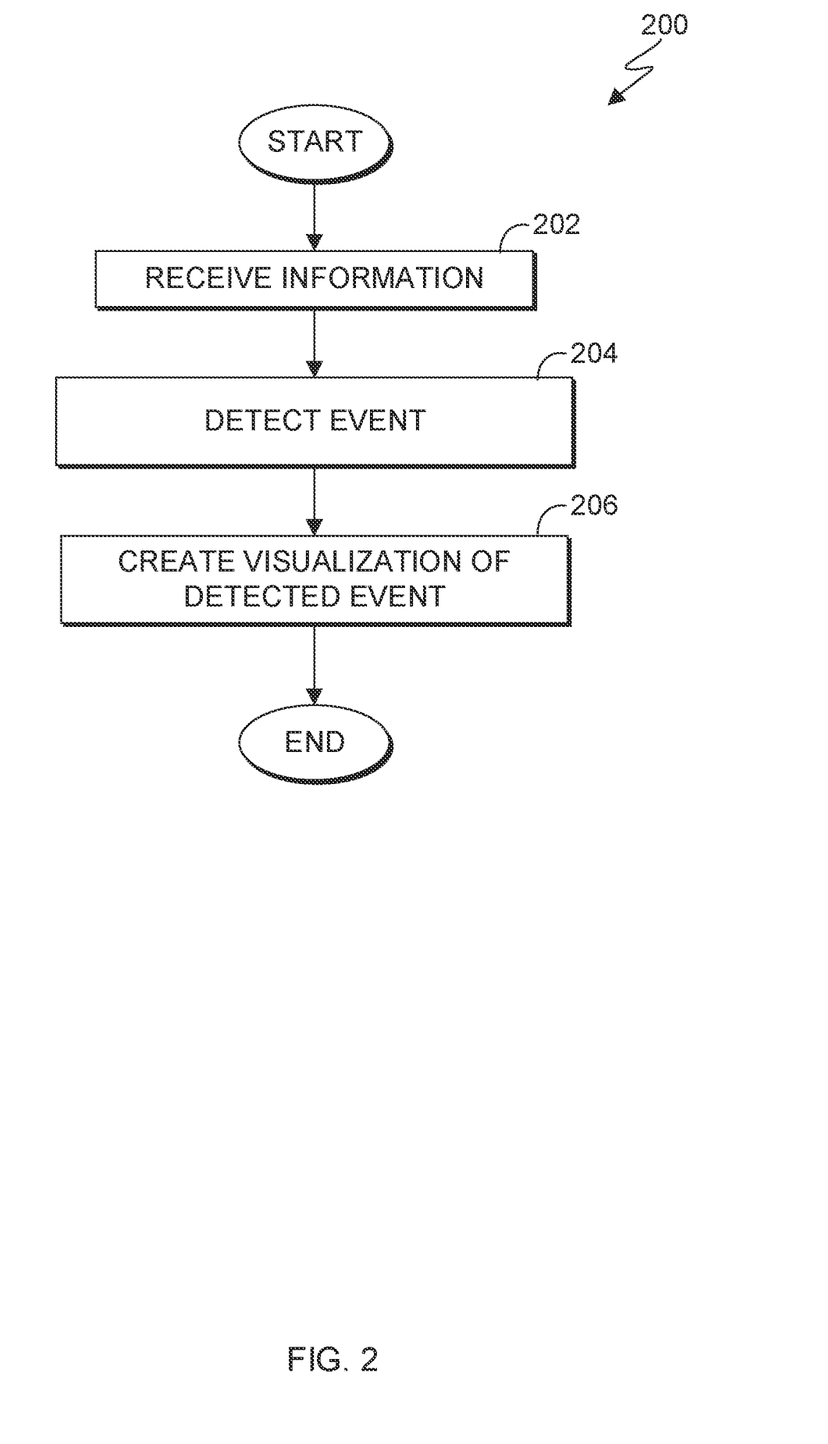
FIG. 2 is a flowchart depicting operational steps for detecting an event, in accordance with an embodiment of the present invention.

FIG. 2 is a flowchart 200 depicting operational steps for detecting an event, in accordance with an embodiment of the present invention.

In step 202, safety manager 110 receives information. In this embodiment, safety manager 110 receives a request from client computing device 102 to register for the services of safety manager 110. For example, safety manager 110 can receive requests from one or more wearable devices (e.g., smart watch, shoes, certain Internet of Things (IoT) connected devices such as a smart clothing, fitness tracker, health device, etc.). In this way, safety manager 110 can continually identify relative positioning of a user (e.g., body positioning indicating movement, seated position, lying down, etc.). In other embodiments, safety manager 110 can receive information from one or more other components of computing environment 100.

Information received by safety manager 110 can also include received user biometric information. For example, safety manager 110 can collect and subsequently store a user's baseline biometric measurements (with the user's informed consent) utilizing one or more sensors from any number of wearable devices. In other embodiments, safety manager 110 can also receive information from devices other than wearable devices such as movement pattern, angular positioning, etc. Information can also include one or more established or otherwise created user profiles storing or otherwise having health information associated with a specific user.

In some embodiments, safety manager 110 can receive other health information with respect to a user to aid in establishing a baseline set of biometric metric information. For example, safety manager 110 can also receive sleep information, exercise information (e.g., duration, average heart rate during exercise, recovery heartrate, that is, a measurement of how quickly a heartrate returns to normal after being elevated during a workout, environment sound levels, and certain other movement information (e.g., step count, hours standing, etc.).

In this way, safety manager 110 can identify types of activity or mobility performed by the user (e.g., walking on a planar surface, hiking, on an elevator, walking up and down stairs, etc.). For example, safety manager 110 can identify types of activity utilizing the received information, comparing the received information to stored, known types of activity matching the same biometric information (e.g., for walking, running, hiking, etc.).

Information received by safety manager 110 can include user requests to register for and informed consent to utilize services provided by safety manager 110. For example, safety manager 110 can receive a user request to register with safety manager 110. Information received by safety manager 110 can also include user preferences (referred to a user criteria). For example, user criteria can include certain repeated activities that can mimic an event but should otherwise be considered non-events. For example, a user can specify that during periods of time such as exercising, movement that could be considered an event (e.g., falling) can be ignored during such time (e.g., when a user is performing an exercise movement such as a burpee that requires a user to drop to the ground, stand back up, and jump repetitively until a specific repetition scheme is met).

In step 204, safety manager 110 detects an event. In this embodiment, safety manager 110 detects an event by measuring sudden changes (e.g., statistically significant deviations) to a user's baseline biometric measurements (e.g., normal, active, and resting heart rates, oxygen levels, etc.). In other embodiment, safety manager 110 can receive an indication that there is a detected event. For example, safety manager 110 can receive a notification from one or more other wearable devices (e.g., a smartwatch) indicating there is an event.

In this embodiment, in response to detecting an event, safety manager 110 stores recordings of the user's health condition at that moment and preceding moments (e.g., within a preconfigured timeframe). For example, in response to detecting an event, safety manager 110 stores recordings of the user's blood pressure, type of activity, grip over the surfaces the user interacted with, speed, etc.

In step 206, safety manager 110 creates a visualization of the detected event. In this embodiment, safety manager 110 creates a visualization of the detected event utilizing Generative Adversarial Networks (GANs) leveraging stored information, and continually received information associated with the detected event as discussed in greater detail with regard to FIG. 3.

Figure 3:
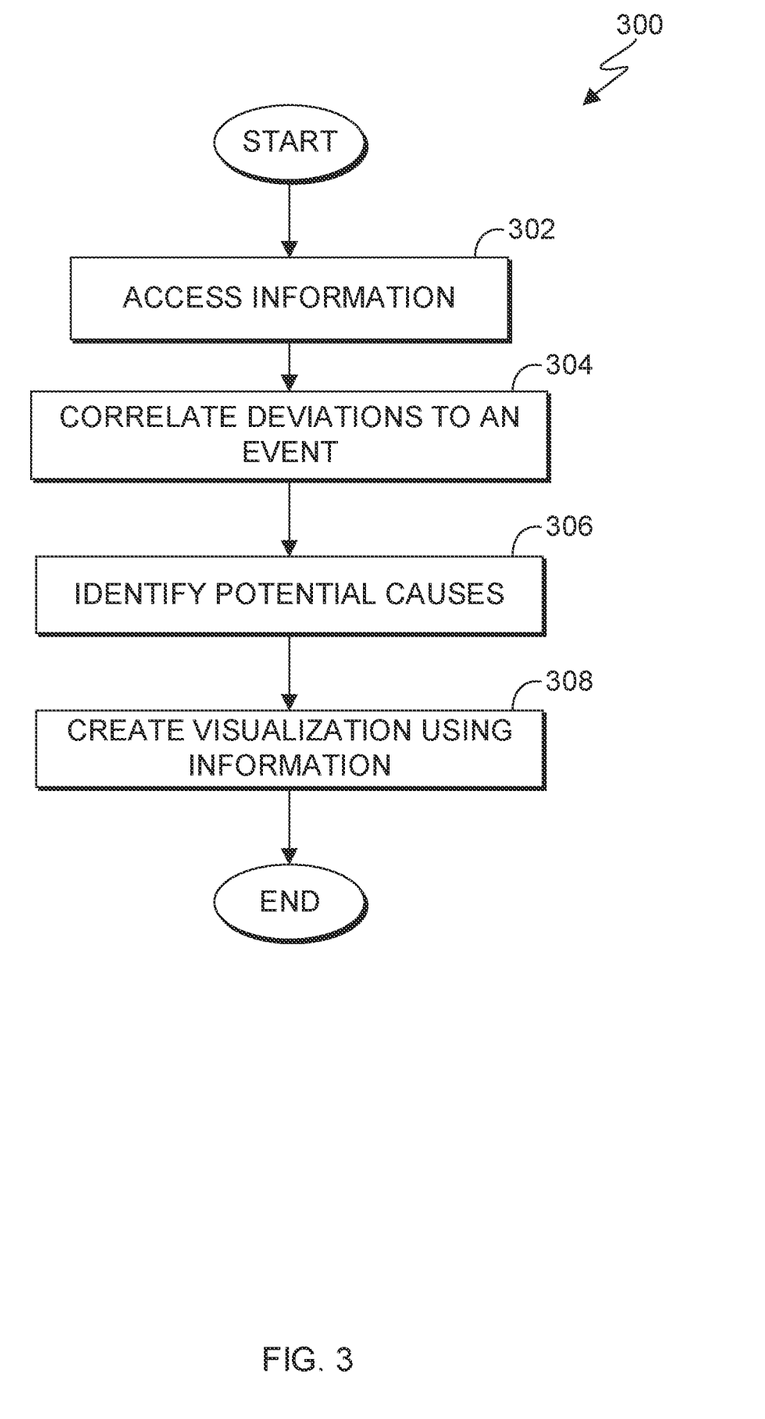
FIG. 3 is a flowchart depicting operational steps for creating a visual representation of the detected event, in accordance with an embodiment of the present invention.

FIG. 3 is a flowchart 300 depicting operational steps for creating a visual representation of the detected event, in accordance with an embodiment of the present invention.

In step 302, safety manager 110 accesses information. In this embodiment, safety manager 110 accesses information by retrieving stored information on database 112 and can continually receive information from one or more sensors of associated wearable devices (e.g., other health information, GPS, current heartrate, etc.). As mentioned above, information received by safety manager 110 refers to received user biometric information (e.g., baseline biometric information). Information can also include one or more established or otherwise created user profiles storing or otherwise having health information associated with a specific user.

In this manner, safety manager 110 can identify relative body positioning of the user based on the accessed information from each of the one or more sensors of the wearable devices. For example, safety manager 110 can identify specific body positioning based on sensor data from a user's smart watch, information from user's smart clothing, etc. moments before the detected event, during the detected event, and immediately after the detected event.

In step 304, safety manager 110 correlates deviations to a detected event. In this embodiment, safety manager 110 correlates deviations to a detected event by retrieving measured changes (e.g., statistically significant deviations) and correlating the deviations to the detected event. For example, where safety manager 110 has received an indication of an event, safety manager 110 can correlate sudden changes to the user's biometrics with the detected event. Specifically, in this example, safety manager 110 can, in response to receiving an indication of an event (e.g., a fall) correlate GPS location to the event, correlate sudden elevation changes, heart rate changes, body positioning (where data is available) to the detected event.

In step 306, safety manager 110 identifies potential causes for the event. In this embodiment, safety manager 110 identifies potential causes for the event by utilizing one or more machine learning algorithms and artificial intelligence algorithms. For example, in some embodiments safety manager 110 can predict a cause of the event (e.g., a series of movements that led to a fall) and can understand contextual situation that led to the event through historical learning. In other embodiments, safety manager 110 attempt to identify potential causes based on identified patterns (e.g., using pattern analysis) within the accessed information. In this way, safety manager 110 can identify or otherwise predict a reason for the detected event (e.g., low blood pressure occurred during a fall, slipping on a surface, walking down the stairs, accidents, etc.). In this embodiment, safety manager 110 can feed the accessed information to one or more machine learning algorithms an improve its analysis through historical learning.

In step 308, safety manager 110 creates a visualization of the detected event. In this embodiment, safety manager 110 creates a visualization using the accessed information and the identified potential causes. For example, safety manager 110 can utilize one or more generative adversarial networks (GANs) to create a visual simulation of the detected event (e.g., a user falling).

Safety manager 110 can then create one or more graphic icons to overlay over the visual simulation to highlight one or more potential causes. For example, safety manager 110 can create a graphic icon to be overlaid and subsequently displayed on a user device over an image corresponding to a potential cause. Specifically, in an example where the detected event is a fall, safety manager 110 can create a graphic icon (e.g., a circle or other suitable marking) that highlights or otherwise points out one or more objects, and/or actions leading to the event (e.g., a slick floor, uneven pavement, etc.). Similarly, safety manager 110 can also create graphic icons that can overlay on specific portions of the user's body to indicate areas of the user's body that could be injured as a result of the event. In some embodiments, the graphic icons can be color coded to indicate either a degree of likelihood or indicate areas of immediate concern.

In certain embodiments, safety manager 110 can generate a text report to accompany the visual simulation that notes any predicted change with respect to the cause of the event, an appropriate notification of the detected event, and suggestions to prevent the detected event in the future. For example, safety manager 110 can recommend additional actions a user can take to increase safety (e.g., personal protective equipment, protocols, etc.). In certain other embodiments, safety manager 110 can, with user permission, monitor safety protocols and transmit reminders and notifications to users to follow safety protocols.

In response to detecting an event, safety manager 110 can take one or more actions to assist a user. In this embodiment, an action can include performed tasks taken on behalf of the user. For example, safety manager 110 can call one or more other users (e.g., an SOS call) to emergency services and subsequently transmit the created visual simulation. In some embodiments, these actions can be preconfigured, or otherwise automated workflows performed in response to an event.

Figure 4:
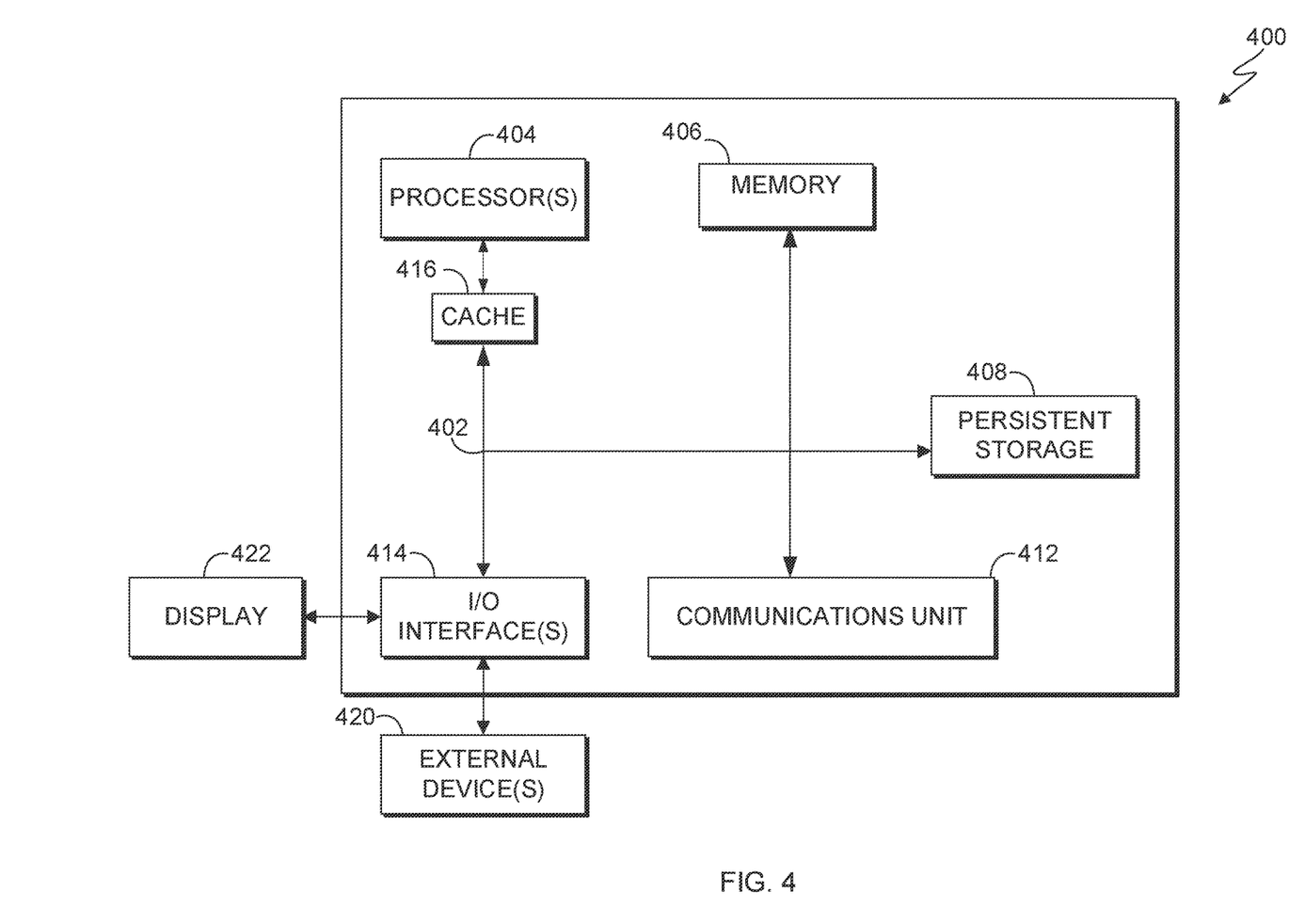
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Safety manager 110 (not shown) may be stored in persistent storage 408 and in memory 606 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Safety manager 110 may be downloaded to persistent storage 508 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., safety manager 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
in response to receiving information, dynamically detecting an event associated with a user; and in response to dynamically detecting an event associated with the user creating a visual simulation of the detected event, wherein creating the visual simulation of the detected event comprises accessing received information associated with baseline measurements for the user, correlating deviations to the baseline measurements of the user to the detected event creating a visual simulation of the detected event depicting the user's movements based on the baseline measurements of the user and the correlated deviations to the baseline measurements, and overlaying one or more graphic icons on the created visual simulation that highlights predicted areas that are relevant to the user based on the detected event and correlated deviations.

2. The computer-implemented method of claim 1, further comprising:

identifying one or more potential causes for the detected event.

3. The computer-implemented method of claim 2, further comprising:

generating one or more graphic icons for each of the one or more potential causes for the detected event.

4. The computer-implemented method of claim 3, further comprising:

overlaying the generated one or more graphic icons for each of the one or more potential causes for the detected event over the created visual simulation of the detected event.

5. The computer-implemented method of claim 4, further comprising:

transmitting the created visual simulation of the detected event to an authorized user.

6. The computer-implemented method of claim 1, further comprising:

generating a textual document accompanying the created visual simulation that notates potential causes for the detected event and potential areas of injury to the user.

7. A computer program product comprising:

one or more computer readable storage media and program instructions stored on the one or more computer readable storage media, the program instructions comprising:

program instructions to, in response to receiving information, dynamically detect an event associated with a user; and program instructions to, in response to dynamically detect an event associated with the user, create a visual simulation of the detected event, wherein the program instructions to create a visual simulation of the detected event comprises:

program instructions to access received information associated with baseline measurements for the user, program instructions to correlate deviations to the baseline measurements of the user to the detected event, program instructions to create a visual simulation of the detected event depicting the user's movements based on the baseline measurements of the user and the correlated deviations to the baseline measurements, and program instructions to overlay one or more graphic icons on the created visual simulation that highlights predicted areas that are relevant to the user based on the detected event and correlated deviations.

8. The computer program product of claim 7, wherein the program instructions stored on the one or more computer readable storage media further comprise:

program instructions to identify one or more potential causes for the detected event.

9. The computer program product of claim 8, wherein the program instructions stored on the one or more computer readable storage media further comprise:

program instructions to generate one or more graphic icons for each of the one or more potential causes for the detected event.

10. The computer program product of claim 9, wherein the program instructions stored on the one or more computer readable storage media further comprise:

program instructions to overlay the generated one or more graphic icons for each of the one or more potential causes for the detected event over the created visual simulation of the detected event.

11. The computer program product of claim 10, wherein the program instructions stored on the one or more computer readable storage media further comprise:

program instructions to transmit the created visual simulation of the detected event to an authorized user.

12. The computer program product of claim 7, wherein the program instructions stored on the one or more computer readable storage media further comprise:

program instructions to generate a textual document accompanying the created visual simulation that notates potential causes for the detected event and potential areas of injury to the user.

13. A computer system comprising:

one or more computer processors;

one or more computer readable storage media; and program instructions stored on the one or more computer readable storage media for execution by at least one of the one or more computer processors, the program instructions comprising:

program instructions to, in response to receiving information, dynamically detect an event associated with a user; and program instructions to, in response to dynamically detect an event associated with the user, create a visual simulation of the detected event, wherein the program instructions to create a visual simulation of the detected event comprises:

program instructions to access received information associated with baseline measurements for the user, program instructions to correlate deviations to the baseline measurements of the user to the detected event, program instructions to create a visual simulation of the detected event depicting the user's movements based on the baseline measurements of the user and the correlated deviations to the baseline measurements, and program instructions to overlay one or more graphic icons on the created visual simulation that highlights predicted areas that are relevant to the user based on the detected event and correlated deviations.

14. The computer system of claim 13, wherein the program instructions stored on the one or more computer readable storage media further comprise:

program instructions to identify one or more potential causes for the detected event.

15. The computer system of claim 14, wherein the program instructions stored on the one or more computer readable storage media further comprise:
program instructions to generate one or more graphic icons for each of the one or more potential causes for the detected event.

16. The computer system of claim 15, wherein the program instructions stored on the one or more computer readable storage media further comprise:
program instructions to overlay the generated one or more graphic icons for each of the one or more potential causes for the detected event over the created visual simulation of the detected event.

17. The computer system of claim 16, wherein the program instructions stored on the one or more computer readable storage media further comprise:
program instructions to transmit the created visual simulation of the detected event to an authorized user.

* * * * *